Patented Aug. 8, 1933

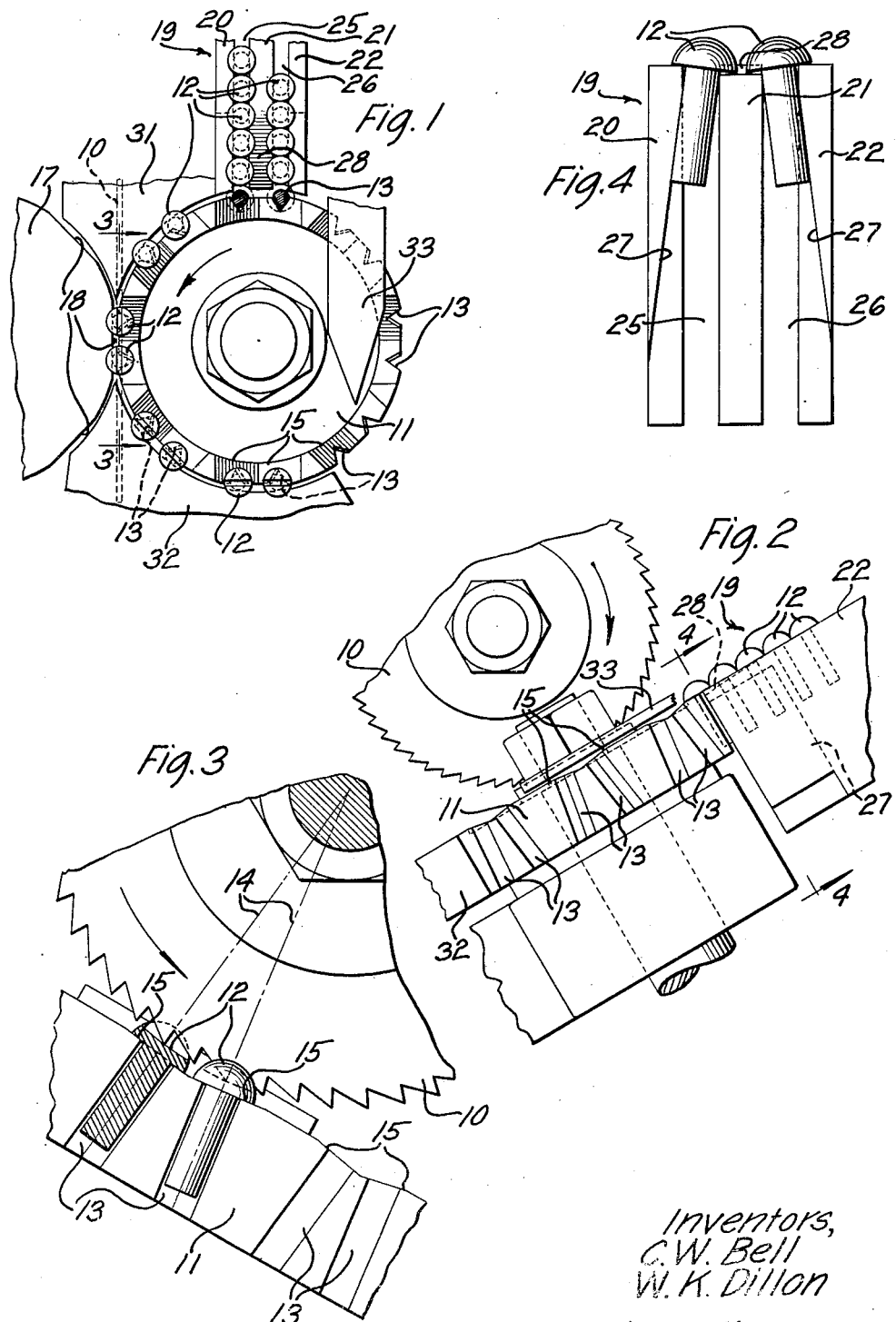

1,921,403

UNITED STATES PATENT OFFICE

1,921,403
ARTICLE WORKING APPARATUS

Charles W. Bell and Warren K. Dillon, Chicago, Ill., assignors to Western Electric Company, Incorporated, New York, N. Y., a Corporation of New York Application December 31, 1931. Serial No. 584,096

8 Claims. (Cl. 10—6)

This invention relates to article working apparatus, and more particularly to screw slotting machines.

An object of the invention is to increase the output and efficiency of machines of this type without sacrificing quality or uniformity of the products thereof.

Another object of the invention is to increase the output and efficiency of screw slotting machines without increasing the number or operating speeds of the working parts thereof.

One embodiment of the invention contemplates the provision in a screw slotting machine including a rotary circular cutter, of means for intermittently advancing screw blanks to the cutter and for predeterminedly positioning and supporting the blanks so that two or more blanks may be slotted simultaneously and uniformly. In a preferred form of the invention, a rotary carrier is provided for advancing the screw blanks to the cutter, the carrier being of substantially circular contour and having formed upon its periphery a plurality of screw blank receiving recesses arranged in circumferentially spaced pairs with the recesses of each pair constructed and arranged to predeterminedly position the blanks while being slotted so that their axes extend substantially radially of the cutter upon the completion of the slotting operation. The carrier is intermittently indexed to successively advance each pair of recesses to loading, slotting, and ejecting positions. At the loading position each pair of recesses receives a pair of screw blanks from a pair of gravity chutes and the blanks so received are intermittently advanced in pairs to the slotting position where they are simultaneously slotted by the cutter.

Other objects and advantages of this invention will more fully appear from the following detailed description taken in connection with the accompanying drawing, in which Fig. 1 is a fragmentary plan view of a screw slotting machine embodying the features of this invention, the slotting saw being indicated in broken lines for the sake of clearness;

Fig. 2 is a vertical side view thereof looking at the right side of Fig. 1, the slotting saw being shown fragmentarily;

Fig. 3 is an enlarged vertical section taken on the line 3—3 of Fig. 1, the slotting saw being shown fragmentarily, and Fig. 4 is an enlarged vertical section taken on the line 4—4 of Fig. 2.

In the accompanying drawing, the invention is shown embodied in a screw slotting machine, such as is used for slotting the heads of screw blanks. Numerous parts and adjuncts of the machine are omitted from the drawing for the sake of simplifying the disclosure, only such portions thereof being illustrated as are necessary to a complete understanding of the present invention. For a detailed illustration and description of one type of screw slotting machine to which the present invention may be advantageously applied, reference is made to Patent 1,584,263, granted R. L. Wilcox, May 11, 1926. It is believed sufficient herein to state that in a machine of this type, which is fragmentarily illustrated in the drawing, a rotary and oscillatory cutter or slotting saw 10 is actuated in timed relation with intermittent rotary movements of a carrier 11 to slot the heads of screw blanks 12 carried in peripheral recesses of the carrier.

The carrier 11 in accordance with the present invention is of substantially circular contour and has formed upon its periphery a plurality of screw blank receiving recesses 13 arranged in circumferentially spaced pairs. As clearly indicated in Fig. 3, the recesses 13 comprising each spaced pair thereof are oppositely inclined at equal angles with respect to the plane of the carrier, the inclination thereof being such that the blanks 12 carried in each pair of recesses will be positioned so that their axes will extend radially of the saw 10 upon the completion of the slotting operation as indicated by the broken lines 14 (Fig. 3). Thus it will be apparent that two screw blanks 12 will be simultaneously and uniformly slotted for each actuation of the slotting saw 10.

The upper surface of the carrier 11 is formed so that the upper ends of the inclined recesses 13 terminate at individual seating surfaces 15 (Fig. 3) for the heads of screw blanks carried in the respective recesses, the surfaces 15 being disposed perpendicular to the plane of inclination of the respective recesses, thus cooperating with the recesses to position and support the screw blanks so that their axes extend radially of the slotting saw upon the completion of the slotting operation, as described above.

A blank clamping disc 17, shown fragmentarily in Fig. 1, is moved toward the carrier at the termination of successive movements thereof to engage the shanks of the blanks 12 carried thereby and clamp the blanks to the carrier during the slotting operation in the manner illustrated and described in the patent above referred to.

In the present embodiment of this invention, the clamping disc 17 is provided with a plurality of flat faces 18 upon its periphery, corresponding in number with the number of pairs of recesses 13 in the periphery of the carrier 11 so that each blank 12 carried in the aligned pair of recesses will be similarly engaged and held clamped to the carrier. By providing a plurality of flat faces 18 in the disc 17 a new face may be used when excessive wear occurs on a face, which has been used, by simply releasing the disc upon its mounting (not shown), rotating it to align a new face and then reclamping it upon its mounting.

The carrier 11 is intermittently indexed in synchronism with the operation of the slotting saw 10, whereby each pair of recesses of the carrier is advanced first to a loading position and thereafter to the slotting position. At the loading position of the carrier 11 each pair of recesses 13 thereof, in the present invention, receives a pair of screw blanks 12 from a pair of gravity chutes 19, shown fragmentarily, comprising three inclined plates 20, 21 and 22. The upper surfaces of the plates 20, 21 and 22 lie substantially in the same plane as the upper surface of the carrier 11 (Fig. 2) and form two openings or slideways 25 and 26 between the plates for two trains of headed screw blanks 12, which are fed thereto with their heads uppermost from an automatic hopper mechanism (not shown) or other source of succession of multiple trains of blanks. The lower ends of the chute plates 20, 21 and 22, which are arranged adjacent the peripheral recessed surface of the carrier 11, are recessed and beveled as indicated at 27 on the inner surfaces of the plates 20 and 22 and at 28 on the upper surface of the plate 21, respectively, to cause the blanks 12 as they move downwardly along the slideways 25 and 26 with the under surface of the heads of the blanks engaging the upper surfaces of the plates to assume angles (Fig. 4) similar to the angles of the associated recesses 13 of the carrier 11 so that the blanks will readily enter the recesses upon the latter being indexed into alignment therewith in the operation of the machine.

While the blanks 12 are being conveyed, in the direction indicated by the arrow (Fig. 1), from the point at which they enter the recesses 13 of the carrier 11 from the chute slideways 25 and 26 to the position where the saw 10 operates upon them they are held in the recesses by a plate 31 having a curved face which lies adjacent the periphery of the carrier 11 and after the slotting operation the blanks are still held by a plate 32 similarly positioned with respect to the carrier 11 until the slotted blanks 12 drop by gravity from the carrier recesses 13 to a receiving receptacle (not shown). In case the slotted blanks 12 do not fall from the carrier recesses 13, as just described, a stripper plate 33 extending over the upper surface of the carrier 12 will be engaged upon a cam face thereof by the slotted heads of the blanks 12 during the continued movement thereof with the carrier and force them out of the recesses thereof before being indexed again to the loading position.

It is believed that the operation of the apparatus will be clearly understood from the above description. It will be apparent that by applying the features of the present invention to screw slotting machines and the like, the output and efficiency of such machines is greatly increased without sacrificing quality or uniformity of the products thereof, and without increasing the number or operating speeds of the working parts of such machines. Furthermore, it has been found that when two or more screws are slotted simultaneously, the screws provide an increased guiding and bearing surface for the slotting saw which insures that one or more teeth of the saw will be in contact at all times with one or another of the screws being slotted. This decreases wear upon the saw by decreasing shocks or chattering thereof, and thus the operating speeds of the working parts of the machine may be increased materially without appreciably increasing the wear thereon, whereby the output of such machines may be further increased.

Although the preferred embodiment of this invention has been described in connection with a screw slotting machine, it will be understood that the invention is capable of other applications within the scope of the appended claims.

What is claimed is:

1. In an apparatus for working blanks, a circular tool for simultaneously working a plurality of blanks, and means for predeterminedly supporting and positioning the blanks while being worked upon by the tool so that their longitudinal axes extend radially of the tool.

2. In a screw slotting machine, a circular cutter for simultaneously slotting a plurality of screw blanks, and means for predeterminedly supporting and positioning the blanks while being slotted so that their axes extend radially of the cutter.

3. In a screw slotting machine, a circular cutter for simultaneously slotting a plurality of screw blanks, and a blank carrier having a plurality of recesses arranged in pairs with the recesses of each pair constructed and arranged for predeterminedly positioning and supporting a pair of blanks so that their axes extend radially of the cutter.

4. In a screw slotting machine, a circular cutter for simultaneously slotting a plurality of screw blanks, and a circular blank carrier having a plurality of peripheral recesses arranged in spaced pairs with the recesses of each pair oppositely inclined at substantially equal angles for positioning a pair of blanks while being worked upon by the cutter so that their axes extend substantially radially of the cutter.

5. In a screw slotting machine, a circular cutter for simultaneously slotting a plurality of screw blanks having shank and head portions, and a circular blank carrier having a plurality of peripheral recesses for receiving the shank portions of the blanks, said recesses arranged in spaced pairs with the recesses of each pair oppositely inclined at equal angles and terminating at one end at individual seating surfaces for the head portions of the screw blanks, said seating surfaces being disposed perpendicular to the plane of inclination of the respective recesses and cooperating therewith to predeterminedly position and support a pair of blanks while being slotted by the cutter so that their axes extend substantially radially of the cutter.

6. In a screw slotting machine, a circular cutter for simultaneously slotting a plurality of screw blanks, a circular blank carrier having a plurality of peripheral recesses arranged in pairs with the recesses of each pair constructed and arranged for predeterminedly positioning and supporting a pair of blanks while being slotted by the cutter so that their axes extend radially of the cutter and means for delivering a pair of blanks successively to each pair of recesses.

7. In a screw slotting machine, a circular cutter for simultaneously slotting a plurality of screw blanks, a circular blank carrier having a plurality of peripheral recesses arranged in pairs with the recesses of each pair oppositely inclined at substantially equal angles for positioning a pair of blanks while being worked upon by the cutter so that their axes extend substantially radially of the cutter, and a pair of chutes for delivering a pair of blanks successively to each pair of recesses, the chutes constructed and arranged at their delivery ends for delivering the blanks to the inclined recesses at angles similar to the angles of the recesses.

8. In a screw slotting machine, a circular cutter for simultaneously slotting a plurality of blanks, a circular blank carrier having a plurality of means arranged in spaced pairs for predeterminedly supporting and positioning a pair of blanks while being slotted so that their axes extend substantially radially of the cutter, and a pair of chutes for delivering a pair of blanks successively to each pair of blank supporting and positioning means on the carrier, said chutes comprising three inclined spaced plates forming a pair of slideways for two trains of blanks, the inner surfaces of the lower ends of the outer plates being recessed and beveled and the upper surface of the intermediate plate at its lower end being beveled for causing the blanks to be delivered to the blank supporting and positioning means on the carrier in a predetermined position with their axes extending substantially radially of the cutter.

CHARLES W. BELL.
WARREN K. DILLON.